United States Patent
Di Iorio et al.

(10) Patent No.: US 12,229,417 B2
(45) Date of Patent: Feb. 18, 2025

(54) METHOD AND DEVICE FOR WRITING SOFTWARE OBJECTS INTO AN ELECTRONIC CONTROL UNIT OF AN INTERNAL COMBUSTION ENGINE

(71) Applicant: Lombardini S.R.L., Reggio Emilia (IT)

(72) Inventors: Felice Di Iorio, Modena (IT); Federico Costa, Bologna (IT); Roberto Massaro, Reggio Emilia (IT)

(73) Assignee: Lombardini S.r.L, Reggio Emilia (IT)

(*) Notice: Subject to any disclaimer, the term of this patent is extended or adjusted under 35 U.S.C. 154(b) by 500 days.

(21) Appl. No.: 17/195,198

(22) Filed: Mar. 8, 2021

(65) Prior Publication Data

US 2021/0200451 A1  Jul. 1, 2021

Related U.S. Application Data

(63) Continuation of application No. 16/409,139, filed on May 10, 2019, now Pat. No. 11,068,173.

(30) Foreign Application Priority Data

May 17, 2018  (IT) .................. 102018000005466

(51) Int. Cl.
*G06F 3/06* (2006.01)
*H04L 9/08* (2006.01)

(52) U.S. Cl.
CPC .......... *G06F 3/0622* (2013.01); *G06F 3/0655* (2013.01); *G06F 3/0679* (2013.01); *H04L 9/0869* (2013.01)

(58) Field of Classification Search
CPC .... G06F 3/0622; G06F 3/0655; G06F 3/0679; G06F 21/78; G06F 21/44; H04L 9/0869;
(Continued)

(56) References Cited

U.S. PATENT DOCUMENTS 7,368,940 B1   5/2008 Schultz
2001/0023374 A1  9/2001 Yashiki et al.
(Continued)

FOREIGN PATENT DOCUMENTS

CN   1315275 A   10/2001
CN   104219049 A  12/2014
(Continued)

OTHER PUBLICATIONS

Chinese Office Action from Chinese Patent Application No. 201910406475.3, dated Jan. 4, 2022, 13 pages (including English Summary).
(Continued)

*Primary Examiner* — Sangseok Park
(74) *Attorney, Agent, or Firm* — The Belles Group, P.C.

(57) ABSTRACT

It is hereby disclosed an apparatus for and a method of writing software objects into a rewritable nonvolatile memory of an electronic control unit of an internal combustion engine, wherein the method comprises: receiving an access request from a memory writing device, generating a seed code, transmitting the seed code to the memory writing device, generating a first key code on the basis of the seed code and a first identification code, generating a second key code on the basis of the seed code and a second identification code, receiving a reference key code from the memory writing device, comparing the reference key code with the first key code and/or with the second key code, and enabling the memory writing device to write software objects into the rewritable nonvolatile memory, if the reference key code corresponds to the first key code or to the second key code.

13 Claims, 5 Drawing Sheets

(58) Field of Classification Search
CPC ..... H04L 9/088; H04L 63/10; H04L 2209/84; H04L 9/3271
See application file for complete search history.

(56) References Cited

U.S. PATENT DOCUMENTS

| | | |
|---|---|---|
| 2003/0167373 A1 | 9/2003 | Winters et al. |
| 2005/0179546 A1* | 8/2005 | Lanigan .................. G07C 9/38 340/584 |
| 2009/0287370 A1* | 11/2009 | Iwai ....................... B60W 50/02 701/29.6 |
| 2010/0107608 A1* | 5/2010 | Mitsutani ................ B60L 50/16 60/299 |
| 2012/0231764 A1 | 9/2012 | Lindteigen et al. |
| 2013/0227650 A1 | 8/2013 | Miyake |
| 2013/0289762 A1* | 10/2013 | Olaleye .............. B60H 1/00014 700/228 |
| 2014/0317729 A1 | 10/2014 | Naitou et al. |
| 2017/0287235 A1* | 10/2017 | Ozturk ................. G07C 5/0841 |
| 2018/0128197 A1* | 5/2018 | Dahodwala ........... F02D 41/402 |
| 2018/0145991 A1* | 5/2018 | McCauley ............. H04L 9/0891 |
| 2020/0226855 A1* | 7/2020 | Liu ...................... G07C 5/0808 |
| 2020/0249937 A1* | 8/2020 | Teraoka ................. B60R 16/03 |

FOREIGN PATENT DOCUMENTS

| | | | | |
|---|---|---|---|---|
| CN | 104917745 A | | 9/2015 | |
| CN | 105279441 A | | 1/2016 | |
| CN | 107273152 A | | 10/2017 | |
| CN | 107453864 A | * | 12/2017 | ........... H04L 9/0866 |
| CN | 107894790 A | * | 4/2018 | ............ G05D 17/02 |
| WO | WO-2011034083 A1 | * | 3/2011 | ........ F02D 41/2422 |

OTHER PUBLICATIONS

Chinese Office Action from Chinese Patent Application No. 201910406475.3, dated Apr. 24, 2023, 4 pages. (including English summary).

* cited by examiner

METHOD AND DEVICE FOR WRITING SOFTWARE OBJECTS INTO AN ELECTRONIC CONTROL UNIT OF AN INTERNAL COMBUSTION ENGINE

CROSS REFERENCE TO RELATED APPLICATION

This application is a continuation under 37 C.F.R. § 1.53(b) and 35 U.S.C. § 120 of U.S. patent application Ser. No. 16/409,139 filed May 10, 2019, which claims priority to and the benefit of Italian National Patent Application No. 102018000005466, filed May 17, 2018, each of which is hereby incorporated by reference in its entirety.

FIELD OF THE DISCLOSURE

The present disclosure relates to a method and a device for writing (or overwriting) software objects into a rewritable nonvolatile memory of an electronic control unit of an internal combustion engine.

BACKGROUND INFORMATION

It is known that an internal combustion engine, for example a combustion engine of a motor vehicle, may be equipped with an electronic control unit (ECU) for controlling various engine operating devices (e.g. fuel injectors).

SUMMARY OF THE DISCLOSURE

The electronic control unit or engine control unit (ECU) may include a central processing unit (CPU) that controls the engine operating devices using predetermined software objects, including engine control programs and calibration data (e.g. data tables/maps), which may be stored into a rewritable nonvolatile memory (e.g. a flash memory) of the ECU.

These software objects may be written (or overwritten) by means of an external memory writing device that can be connected to the ECU.

To get access to the memory, the user of the memory writing device may undergo an authentication procedure by means of which only the engine manufacturer (i.e. authorized personnel of the engine manufacturer) is allowed to write (or overwrite) engine control programs and calibration data.

By changing control programs and/or calibration data stored into the memory, the engine manufacturer may change the performance of the internal combustion engine in many aspects, for example in terms of power generation, polluting emissions, etc.

In this way, the engine manufacturer may be able to supply his clients (e.g. vehicles' manufacturers) with a comprehensive range of internal combustion engines based on the same mechanical construction.

However, this approach implies for the engine manufacturer to write in-house the memories of all the ECUs and, for each specific configuration of control programs and calibration data, assign to these ECUs a different part-number and keep in stock at least a minimum quantity of ECUs for each part-number, thereby increasing industrial and warehouse costs.

In view of the foregoing, an object of the present disclosure is that of solving, or at least positively reducing, the above mentioned drawback by providing a solution that is able to reduce the costs that the engine manufacturer has to cover in connection with the management of the ECUs.

Another object is that of reaching this goal with a simple, rational, secure, and rather inexpensive solution.

This and other objects are achieved by the embodiments of the disclosure having the features included in the independent claims. The dependent claims delineate additional aspects of the various embodiments.

An embodiment of the present disclosure provides a method of writing (or overwriting) software objects into a rewritable nonvolatile memory of an electronic control unit (ECU) of an internal combustion engine, wherein the method comprises:
  receiving an access request from a memory writing device,
  generating a seed code,
  transmitting the seed code to the memory writing device,
  generating a first key code on the basis of the seed code and a first identification code (e.g. a first password),
  generating a second key code on the basis of the seed code and a second identification code (e.g. a second password),
  receiving a reference key code from the memory writing device,
  comparing the reference key code with the first key code and/or with the second key code, and
  enabling the memory writing device to write software objects into the rewritable nonvolatile memory, if the reference key code corresponds (e.g. is equal) to the first key code or to the second key code.

Thanks to this solution, the memory of the ECU may only be written (or overwritten) if the memory writing device, which may be an external electronic device configured to be connected to the ECU, is able to provide a reference key code matching with the first or the second key code, thereby performing an authentication procedure that prevents unauthorized use of the memory writing device. In other words, only memory writing devices that are able to provide a reference key code matching with the first or the second key code are allowed to write or overwrite the memory of the ECU and, since the first and the second key codes are generated on the basis of a first and a second identification codes that may be kept confidential and only provided to authorized users, this procedure guarantees that the memory of the ECU remains secure and cannot be written (e.g. tampered) by unauthorized users. On the other hand, since this authentication procedure may be satisfied by two different values of the reference key code, the memory writing device may be validly used by two authorized users, for example by the engine manufacturer and by a client thereof (e.g. the manufacturer of the vehicle using the internal combustion engine). In this way, while the engine manufacturer always remains in control of the internal combustion engine he produces, the software objects may be written into the memory of the ECU by the vehicle manufacturer, thereby reducing the costs that the engine manufacturer has to cover in connection with the management of the ECUs.

According to some embodiments, the first key code may be generated, if (i.e. provided that) the access request corresponds to a first type access request, and the second key code may be generated, if (i.e. provided that) the access request corresponds to a second type access request.

In this way, the first key code and the second key code are not generated all the times the method is executed.

When a first type access request is received, the method may provide for only generating the first key code, only comparing the reference key code with the first key code, and only enabling the memory writing device to write software objects into the rewritable nonvolatile memory, if the reference key code corresponds (e.g. is equal) to the first key code. When a second type access request is received, the method may provide for only generating the second key code, only comparing the reference key code with the second key code, and only enabling the memory writing device to write software objects into the rewritable nonvolatile memory, if the reference key code corresponds (e.g. is equal) to the second key code.

Other embodiments may however prescribe that both the first key code and the second key code are generated all the times the method is executed.

In this case, the reference key code may be compared with both the first key code and the second key code, and the memory writing device may be enabled to write software objects into the rewritable nonvolatile memory, if the reference key code corresponds to the first key code or to the second key code.

According to an aspect of the method, the software objects the memory writing device is enabled to write (or overwrite) into the rewritable nonvolatile memory, if the reference key code corresponds to the first key code or to the second key code, may include at least engine control programs and/or calibration data.

In this way, the engine manufacturers will be able to supply internal combustion engines having only one kind of ECUs, for example ECUs whose memory does not have engine control programs and calibration data stored into it (blank ECUs) or whose memory only have provisional control programs and/or calibration data that, for example, do not allow the internal combustion engine to actually operate, whereas the effective engine control programs and/or calibration data can be written or overwritten into the memory by the client who buys the internal combustion engine.

According to another aspect of the method, the first identification code and the second identification code may be stored into the rewritable nonvolatile memory. In particular, the first and the second identification codes may be stored into the rewritable nonvolatile memory beforehand, i.e. before the execution of the authentication procedure embodied by the method described above, for example by the supplier of the electronic control unit.

Thank to this solution, the first and the second identification codes are preserved within the ECU increasing the safety of the method, i.e. increasing the certainty that unauthorized cannot access the memory of the ECU.

In particular, the first identification code (which may be assigned for example to the engine manufacturer) may be stored at a fixed memory address of the rewritable nonvolatile memory, for example in a boot storage area thereof.

In this way, the first identification code can be easily retrieved from the prescribed memory address.

On the other hand, the second identification code (which may be assigned for example to the vehicle manufacturers) may be stored at a memory address of the rewritable nonvolatile memory which is encrypted in a pointer code also stored into the rewritable nonvolatile memory.

This pointer code may have a fixed length (e.g. a fixed number of bits) and/or may be stored at a fixed memory address of the rewritable nonvolatile memory, for example in a data storage area thereof.

In this way, the second identification code can be retrieved by reading the pointer code, decrypting the pointer code to get the actual memory address of the second identification code and finally reading the second identification code from the so-obtained memory address.

Thank to this solution, the memory address of the second identification code can be easily changed, for example to allow the second identification code to have different lengths (e.g. different number of bits) and/or to better allocate the storing areas of the rewritable nonvolatile memory to cope with different releases of the engine control programs and/or calibration data to be written into it.

According to an aspect of the method, the seed code may be generated by the electronic control unit, for example by executing a seed generating algorithm that may be stored into the rewritable nonvolatile memory, for example in the boot storage area.

In this way, the seed code is safely generated using internal resources of the electronic control unit, without the need of sharing information with the memory writing device or other external devices.

According to another aspect of the method, the first key code and the second key code may be generated by the electronic control unit, for example by executing a key generating algorithm that may be stored into the rewritable nonvolatile memory, for example in the boot storage area.

In this way, also the first and the second key codes are safely generated using internal resources of the electronic control unit, without the need of sharing information with the memory writing device or other external devices.

The seed generating algorithm and/or the key generating algorithm may be stored into the rewritable nonvolatile memory beforehand, i.e. before the execution of the authentication procedure embodied by the method described above, for example by the supplier of the electronic control unit.

According to an additional aspect of the method, the reference key code may be generated by the memory writing device on the basis of the seed code and a third identification code (e.g. a third password), for example using a key generating algorithm of the same kind of that used for generating the first and the second key codes.

In this way, the memory of the ECU can only be written (or overwritten), if the third identification code used by the memory writing device corresponds (e.g. is equal) to the first identification code or to the second identification code.

The third identification code may be provided to the memory writing device by a user thereof, for example through a user interface such as a keyboard, a card reader, a visual code reader (e.g. a QR code reader) or other.

In this way, the memory writing device will be only enabled to write (or overwrite) the rewritable nonvolatile memory of the ECU, if the user of the memory writing device knows (or is otherwise in possession of) the first identification code or the second identification code.

In other embodiments, the third identification code may be stored in a memory of the device or otherwise memorized inside the device.

In this way, it is possible to predispose a number of devices that are actually capable of access the memory of the ECU and only users that are in possession of one of these devices will be actually able to write the rewritable nonvolatile memory.

According to another aspect, the method may comprise the additional step of enabling the memory writing device to modify the second identification code, if the reference key code received from the memory writing device corresponds to the second key code.

Thanks to this aspect, the user which is in possession of the second identification code, for example the vehicle manufacturer, is allowed to change and/or personalize its code, making it secret for everyone else who buys the same kind of internal combustion engines.

By way of example, the engine manufacturer may ask his supplier to provide ECUs having a predetermined second identification code. When selling the internal combustion engines, the engine manufacturer may communicate the second identification code to all his clients, so that each one of them is enabled to write (or overwrite) the rewritable memory of the ECUs. In their turn, each one of these clients may change the second identification code at will, thereby preventing the ECU's memories of the internal combustion engines he buys from being overwritten by other clients of the engine manufacturer. On the other hand, the engine manufacturer will be always able to write or overwrite the ECU's memory of his internal combustion engines using the first identification code.

In other embodiments, the memory writing device may be enabled to modify the second identification code, if the reference key code received from the memory writing device corresponds to the first key code.

In this way, the second identification code can be changed at any time even by the engine manufacturer.

The method can be also carried out with the help of a computer program comprising a program-code for carrying out all the steps of the method described above, and in the form of a computer program product comprising the computer program. The method can be also embodied as an electromagnetic signal, said signal being modulated to carry a sequence of data bits which represent a computer program to carry out all steps of the method.

Another embodiment of the present disclosure provides an electronic control unit of an internal combustion engine, comprising a rewritable nonvolatile memory and a processing unit configured to:
  receive an access request from a memory writing device,
  generate a seed code,
  transmit the seed code to the memory writing device,
  generate a first key code on the basis of the seed code and the first identification code,
  generate a second key code on the basis of the seed code and the second identification code,
  receive a reference key code from the memory writing device,
  compare the reference key code with the first key code and/or with the second key code, and
  enabling the memory writing device to write software objects into the rewritable nonvolatile memory if the reference key code corresponds (e.g. is equal) to the first key code or to the second key code.

This embodiment achieves similar effects of the method described above, in particular that of allowing at least two authorized users to write (or overwrite) software objects into the rewritable nonvolatile memory of the ECU.

Any one of the additional aspects of the method described above can be applied mutatis mutandis to this embodiment of the disclosure.

In particular, the processing unit may be configured to generate the first key code, if (i.e. provided that) the access request corresponds to a first type access request, and to generate the second key code, if (i.e. provided that) the access request corresponds to a second type access request. The software objects the memory writing device is enabled to write (or overwrite) into the rewritable nonvolatile memory may include at least engine control programs and/or calibration data. The first identification code and the second identification code may be stored into the rewritable nonvolatile memory. The first identification code may be stored at a fixed memory address of the rewritable nonvolatile memory, for example in a boot storage area thereof. The second identification code may be stored at a memory address of the rewritable nonvolatile memory which is encrypted in a pointer code also stored into the rewritable nonvolatile memory, for example at a fixed address thereof. The seed code may be generated by a processing unit of the ECU executing a seed generating algorithm that may be stored into the rewritable nonvolatile memory, for example in the boot storage area. The first key code and the second key code may be generated by the processing unit of the ECU executing a key generating algorithm that may be stored into the rewritable nonvolatile memory, for example in the boot storage area. The memory writing device may include a processing unit configured to generate the reference key code on the basis of the seed code and a third identification code, for example using a key generating algorithm of the same kind of that used for generating the first and the second key codes. The processing unit of the ECU may be further configured to enable the memory writing device to modify the second identification code, if the reference key code received from the memory writing device corresponds to the second key code and/or to the first key code (e.g. any time the memory writing device is allowed to write or overwrite software objects into the rewritable nonvolatile memory).

Another embodiment of the disclosure provides an electronic control unit comprising a processing unit that accesses a memory, the processing unit configured to:
  receive an access request from a device;
  access a first password from the memory;
  calculate a seed based on the first password and send the seed to the device;
  receiving a key generated by the device based on the seed;
  determining if the key is valid;
  grant access to the device when the determination indicates the key is valid; and
  write a second password to the memory after access is granted for use with future access requests.

BRIEF DESCRIPTION OF THE DRAWINGS

The present invention will now be described, by way of example, with reference to the accompanying drawings.

DETAILED DESCRIPTION

Figure 1:
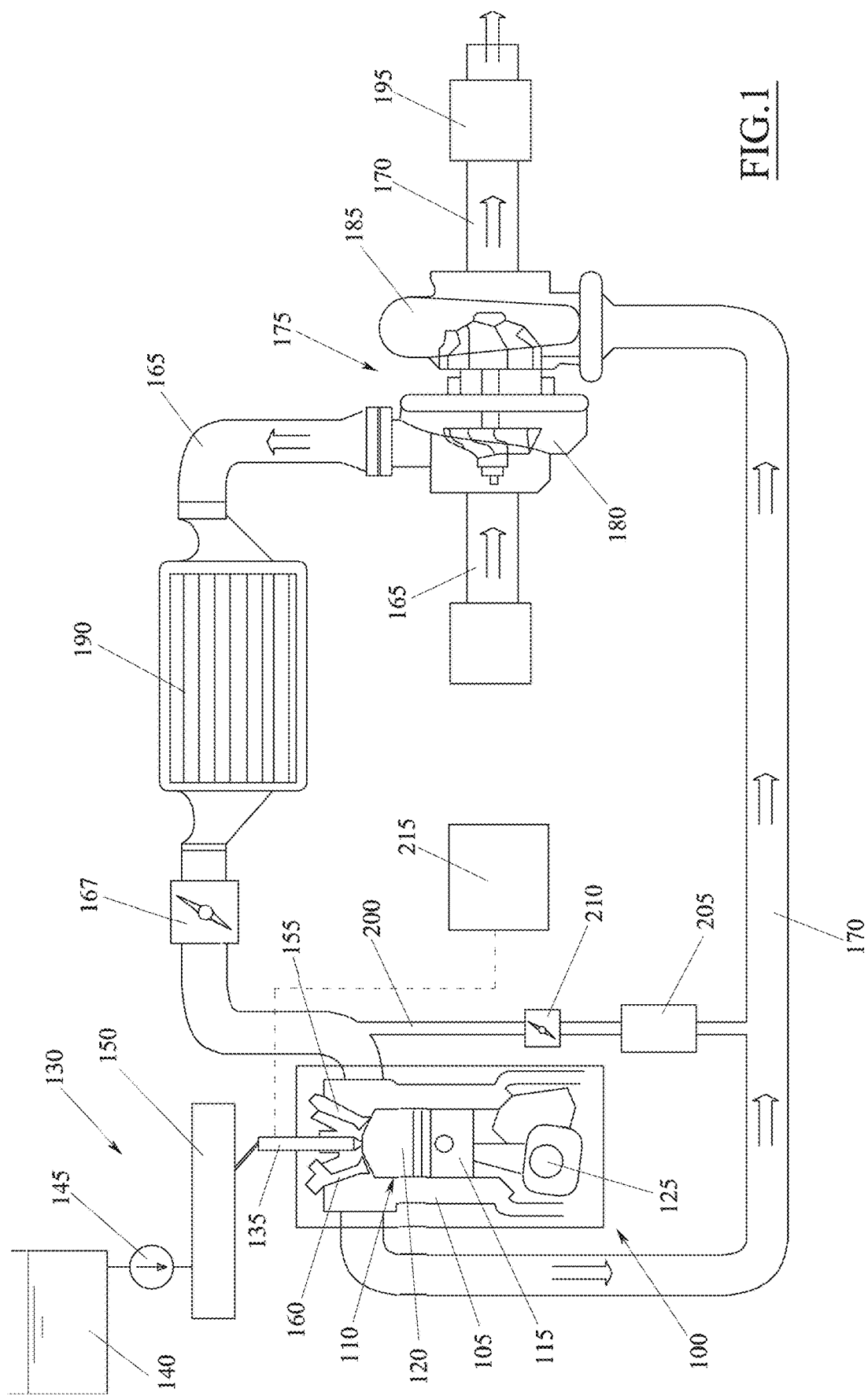
FIG. 1 is a schematic representation an embodiment of an internal combustion engine incorporating the features of the disclosure.

FIG. 1 shows an example embodiment that includes an internal combustion engine (ICE) 100. The internal combustion engine 100 may be, for example, a compression-ignited engine, such as a diesel engine, a spark-ignited engine such as a gasoline engine, or another type of engine. The internal combustion engine 100 may be used in a motor vehicle (not shown), such as a passenger car, a truck or an agricultural off-road vehicle. In other embodiments, the internal combustion engine 100 may be used in power generators or power equipment. The internal combustion engine 100 may be used in various other applications.

The internal combustion engine 100 may include an engine block 105 defining at least one cylinder 110. Each cylinder 110 may accommodate a reciprocating piston 115. Each piston 115 may cooperate with the cylinder 110 to define a combustion chamber 120 designed for receiving a fuel and air mixture. The fuel and air mixture may be ignited (typically via compression, but in some systems may be due to a heater or spark). The ignition of the fuel and air mixture may generate hot expanding exhaust gasses that cause the movement of the piston 115. On the opposite side of the combustion chamber 120, the piston 115 may be connected to a crankshaft 125 in such a way that the reciprocating movements of the piston 115 are transformed in a rotational movement of the crankshaft 125.

Fuel may be supplied into the combustion chamber 120 by an injection apparatus 130 having at least one fuel injector 135. The fuel injector 135 may be coupled to the cylinder 110 or otherwise in fluid communication with the combustion chamber in order to inject fuel directly inside the combustion chamber 120. The injection apparatus 130 may be connected with a fuel source 140 (e.g. a tank), and in some cases additionally a pump 145, that draws the fuel from the fuel source 140 and delivers it to a fuel rail 150 in fluid communication with the fuel injector 135. Other variations of fuel delivery systems are possible.

The internal combustion engine 100 may comprise one cylinder 110. In other systems, the internal combustion engine 100 may comprise a plurality of cylinders 110 (e.g. 2, 3, 4, 6, or 8 cylinders), each of which may accommodate a corresponding piston 115 to define a corresponding combustion chamber 120. In multiple-cylinder engines, the injection apparatus 130 may comprise a plurality of fuel injectors 135, each of which is coupled to a corresponding cylinder 110. All the pistons 115 may be coupled to the same crankshaft 125. Some or all of the fuel injectors 135 may be in fluid communication with the same fuel rail 150.

Each cylinder 110 may have at least two valves, including an intake valve 155 that allows air into the combustion chamber 120 and at least one exhaust valve 160 that allows exhaust gasses to exit from the combustion chamber 120. The valves 155 and 160 may be actuated by a camshaft (not shown) which may rotate in time with the crankshaft 125, wherein a cam phaser may be provided for selectively varying the timing between the camshaft and the crankshaft 125.

Intake air may be conveyed to the intake valve 155 by means of an air intake duct 165 that provides air from the ambient environment to the combustion chamber 120 defined by the cylinder 110. The intake air may be passed through an air filter prior to introduction into the combustion chamber 120. If the internal combustion engine 100 comprises a plurality of cylinders 110, an intake manifold (not shown) may be provided for receiving the air from the intake duct 165 and distributing it into all the cylinders 110 via the corresponding intake valves 155. In some embodiments, a throttle body 167 may be provided in the intake duct 165, for example upstream of the intake manifold if present, to regulate the flow of air into the one or more cylinders 110.

The exhaust gasses (resulting from the ignition of the fuel and air mixture in the combustion chamber 120) may exit the engine cylinder 110 through the one or more exhaust valves 160, and may be directed into an exhaust duct 170. The exhaust duct 170 may convey the exhaust gasses and expel them into the ambient environment. In some embodiments where the internal combustion engine 100 comprises a plurality of cylinders 110, all the corresponding exhaust valves 160 may be in fluid communication with an exhaust manifold (not shown), which may collect the exhaust gasses and direct them into the exhaust duct 170.

In some embodiments, the internal combustion engine 100 may comprises a forced air system, such as a turbocharger 175. The turbocharger 175 may comprise a compressor 180 located in the intake duct 165 and a turbine 185 located in the exhaust duct 170 and rotationally coupled to the compressor 180. The turbine 185 rotates by receiving exhaust gasses from the exhaust duct 170 that directs the exhaust gasses through a series of vanes prior to expansion through the turbine 185. In some examples, the turbine 185 may be a variable geometry turbine (VGT) with a VGT actuator (not shown) arranged to move the vanes to alter the flow of the exhaust gasses through the turbine 185. In other embodiments, the turbocharger 175 may be fixed geometry and/or include a waste gate. The rotation of the turbine 185 causes the rotation of the compressor 180, whose effect is that of increasing the pressure and the temperature of the air in the intake duct 165. An intercooler 190 may be disposed in the intake duct 165, downstream of the compressor 180, to reduce the temperature of the air. Other internal combustion engines may not include a turbocharger 175 and corresponding components for turbocharging.

The internal combustion engine 100 may also comprise one or more aftertreatment devices 195, which may be disposed in the exhaust duct 170 so that the exhaust gasses pass through them prior to expulsion into the ambient environment. In some systems with turbochargers, the aftertreatment devices 195 may be positioned downstream of the turbine 185. The aftertreatment devices 195 may be or include any device configured to change the composition of the exhaust gasses, for example through retention and/or chemical transformation of some of their constituents. Some examples of aftertreatment devices 195 include, but are not limited to, catalytic converters (two and three way), oxidation catalysts, lean $NO_x$ traps, hydrocarbon adsorbers, selective catalytic reduction (SCR) systems, diesel oxidation catalysts (DOC), and particulate filters (e.g. Diesel particulate filters).

Some embodiments may also include an exhaust gas recirculation (EGR) system for recirculating at least part of the exhaust gasses from the exhaust system back to the intake system. The EGR system may include an EGR duct 200 coupled between the exhaust duct 170 and the intake duct 165, for example between the exhaust manifold and the intake manifold when present. The EGR system may further include an EGR cooler 205 to reduce the temperature of the exhaust gasses in the EGR duct 200 and/or an EGR valve 210 for regulating a flow of exhaust gasses in the EGR duct 200. Other engines may not include the EGR system and corresponding components.

The internal combustion engine 100 may further include an electronic control unit (ECU) 215 configured to control the operation of the engine. The ECU 215 may be in communication with one or more sensors configured to generate signals in proportion to various physical parameters associated with the internal combustion engine 100. These sensors may include, but are not limited to, a mass airflow and temperature sensor in the intake duct 165, an intake manifold pressure and temperature sensor, a combustion pressure sensor, coolant and oil temperature and level sensors, a fuel rail pressure sensor, a cam position sensor, a crank position sensor, exhaust pressure and temperature sensors, an EGR temperature sensor and an accelerator (e.g. accelerator pedal) position sensor. Based on the signals received from the sensors, the ECU 215 may be configured to generate output signals to various engine control devices that are arranged to control the operation of the internal combustion engine 100, including, but not limited to, the fuel injectors 135, the throttle body 167, the EGR valve 210, the VGT actuator and the cam phaser.

Figure 2:
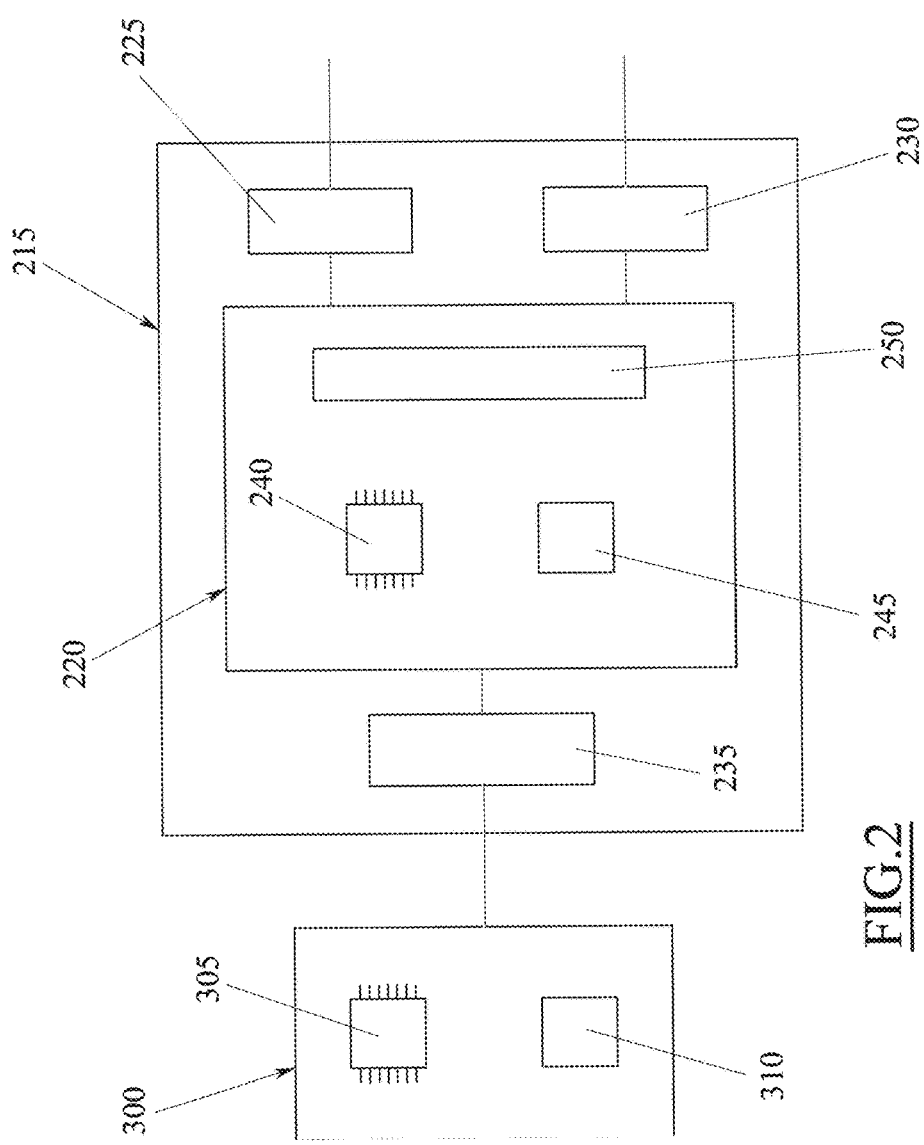
FIG. 2 is a schematic representation of an engine control unit belonging to the internal combustion engine of FIG. 1.

As shown in FIG. 2, the ECU 215 may include a computing system 220, which may be embodied as a computer or a microcomputer. The computing system 220 may receive the sensor signals via an input circuit 225, which may be located in the ECU 215. The input circuit 225 may be configured to perform waveform-shaping, A/D conversion or the like processing of the signals. In the computing system 220, optimum control amounts of the internal combustion engine parameters may be calculated based on the sensor signals, in order to generate the output signals that drive the engine control devices. The output signals may be generated by the computing system 220 using software objects, such as engine control programs and calibration data. The engine control programs may represent the functionalities and/or the procedures (e.g. sequences of instructions) that are executed by the computing system 220 to operate the control devices of the internal combustion engine 100, while the calibration data may represent the settings of these functionalities and/or procedures. An output circuit 230 may be provided in the ECU 215 to receive the output signals from the computing system 220 and to forward them to the control devices. Furthermore, the ECU 215 may include a communication circuit 235 for executing data communications with a memory writing device 300. The memory writing device 300 may be connected to the ECU 215 when software objects, such as engine control programs and/or calibration data, used by the computing system 220 are to be written.

The computing system 220 in the ECU 215 may comprise a central processing unit (CPU) 240, for example a microprocessor, in communication with a tangible or non-transitory machine-readable or computer-readable memory 245 for storing therein engine control programs, calibration data and other software objects to be executed/read by the CPU 240. For example, the CPU 240 may be configured to execute instructions stored as an engine control program in the memory 245. The engine control program may embody control methods, allowing the CPU 240 to carryout out the steps of such methods and control the internal combustion engine 100. The memory 245 may include various storage types including optical storage, magnetic storage, solid state storage, and other nonvolatile memory. In particular, the memory 245 may be a rewritable nonvolatile memory, i.e. any kind of memory capable of erasing programs and data once written and writing programs and data again. In some embodiments, the memory 245 may include a flash memory and/or an erasable programmable read only memory (EPROM). In other embodiments, the memory 245 may comprise a random access memory (RAM), a read only memory (ROM), or other machine-readable medium such as a compact disc rewritable memory (CD-RW), or magnetic or optical disk.

An I/O (input-output) circuit 250 may be provided in the computing system 220 for receiving the signals from the input circuit 225 and the communication circuit 235, and for applying the signals to the output circuit 230. The computing system 220 may further include an interface bus connecting the various circuits. The interface bus may be configured to send, receive, and modulate analog and/or digital signals to/from the various sensors and control devices.

All or parts of the ECU 215 may additionally or alternatively include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. The internal combustion engine 100 may additionally or alternatively be equipped with a different type of processor to provide the electronic logic, e.g. an embedded controller, an onboard computer, or any processing module that might be deployed in the vehicle.

The programs stored in the memory 245 may be transmitted from outside via a cable or in a wireless fashion. Outside the memory 245, the programs may be visible as a computer program products, which may also be called computer readable media or machine readable media in the art, and which should be understood to be computer program codes residing on carriers, said carriers being transitory or non-transitory in nature with the consequence that the computer program products can be regarded to be transitory or non-transitory in nature. An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a wireless connection to a laptop. In case of a non-transitory computer program product the computer program code may be embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an ASIC, a CD or the like.

The processing capability of the ECU 215 may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g. subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Figure 3:
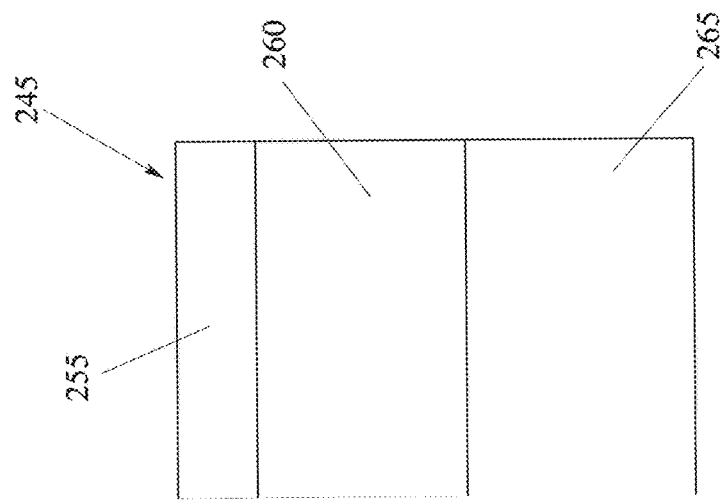
FIG. 3 is a block diagram showing an explanatory internal construction of a rewritable nonvolatile memory used in an embodiment of the disclosure.

An example of the internal constructions of the memory 245 used in the ECU 215 is shown in FIG. 3. According to this embodiment, the memory 245 may comprise several storage areas, including a boot storage area 255 for a boot program, at least one program storage area 260 for storing the engine control programs of the internal combustion engine 100, and at least one data storage area 265 for storing calibration data. These storage areas 255, 260 and 265 may be separated from each other or merged. The boot program may be an elementary software that performs the task of uploading and installing programs (software) and/or data into the memory 245 of the ECU 215. The engine control programs stored into the program storage area 260 may be those that are carried out by the computing system 220 to control the internal combustion engine 100 as explained above. To perform this task, while executing the engine control programs, the computing system 220 may also use the calibration data which are stored in the data storage area 265.

The calibration data may include mathematical models (e.g. functions, equations) and/or data tables (e.g. maps) defining correlations between the various engine operating parameters, which have to be attained to effectively and/or efficiently control the internal combustion engine 100. For example, in order to operate the internal combustion engine 100 properly, the fuel quantities injected by the fuel injectors 135 may depend on the engine speed (i.e. the rotational speed of the crankshaft 125) and on the position of an accelerator, for example an accelerator pedal (not shown). To allow the CPU 240 to command the fuel injectors 135 accordingly, a data table may be provided, each cell of which is located at the intersection of a specific value of the engine speed and a specific value of the accelerator position and contains the value of the fuel quantity corresponding to these input values. This data table may be obtained during an experimental calibration activity and may be stored in the data storage area 265. In this way, during the operation of the internal combustion engine 100, while executing the control programs, the CPU 240 may determine the current values of the engine speed and of the accelerator position, e.g. by means of the dedicated sensors, retrieve or read from the data table the corresponding value of the fuel quantity to be injected, and then command the fuel injectors 135 accordingly. In addition to the parameters mentioned above, the fuel quantity may be also affected by other engine operating parameters, such as for example the air pressure within the intake duct 165, the engine temperature (e.g. the temperature of the engine coolant/water), the position of the throttle valve 167, the pressure of the fuel in the fuel rail 150, etc. As a consequence, for each possible value of one or more of these additional parameters, a specific data table may be determined with an experimental calibration activity and memorized in the data storage area 265. In this way, the data storage area 265 may contain a multiplicity of data tables, among which the CPU 240 may select the right one on the basis of the current value of the additional parameters. In other embodiment, the data table may have more than two dimensions, so as to be able to yield the fuel quantity directly on the basis of three or more engine operating parameters received as input. The calibration data may further include other similar data tables which, by receiving as input one or more measurable engine operating parameters, provide as output corresponding values of a controllable engine operating parameters. In addition to the fuel quantity, these controllable parameters may include for example the injection timing, the position of the turbine vanes, the position of the wastegate valve, the position of the cam phaser and others.

The memory 245 may further store the so-called injector codes (e.g. QR codes) encrypting important technical information on the fuel injectors 135 of the internal combustion engine 100. In fact, although the fuel injectors 135 are manufactured in the same way, their behavior may be slightly different, for example due to production spread. In particular, it may happen that two or more fuel injectors 135 of the same kind supply different fuel quantities, although they are actuated in the same way (e.g. for the same energizing time). For this reason, at the end of the production line, each fuel injector may be tested in order to determine a parameter, usually referred to as injection deviation, which is indicative of the offset between the fuel quantity actually injected by the fuel injector and an expected value thereof. This parameter may be encrypted in the injector code and stored in the memory 245, where it may be read and used by the CPU 240 to properly control the fuel injector 135 during the operation of the internal combustion engine 100. As a consequence, if one fuel injector 135 of the internal combustion engine 100 is replaced, for example due to a malfunctioning, the correspondent injector code in the memory 245 needs to be overwritten with the injection code of the new fuel injector. The memory 245 may also contain other relevant information, such as an identification number of the vehicle using the internal combustion engine 100 and/or vehicle manufacturer's information. This additional information and/or the injection codes may be stored in the data storage area 265 of the memory 245 or in another dedicated storage area thereof. Either way, additional information and/or injector codes may be modified through the memory writing device 300.

As shown in FIG. 2, the memory writing device 300 may be an electronic device. In particular, the memory writing device 300 may be an external device, which is physically separated from the ECU 215 and/or from the internal combustion engine 100. For example, the memory writing device 300 may be designed to be handheld and physically connected to the ECU 215 by a user using cables and/or connectors. In greater details, the memory writing device 300 may comprise a central processing unit (CPU) 305 for executing a serial communication with the computing system 220 of the ECU 215 and/or accessing to the memory 245. As mentioned above, the memory writing device 300 may be able to write or overwrite software objects (e.g. engine control programs and calibration data) in the memory 245. The memory writing device 300 may further comprise a tangible or non-transitory machine-readable or computer-readable memory 310, for example a flash memory and/or an erasable programmable read only memory (EPROM) and/or a RAM, for storing various programs and data, including in some cases the software objects to be written into the memory 245 of the ECU 215. The serial communication between the memory writing device 300 and the ECU 215 may be embodied as a controller area network (CAN-bus), for example an ISO 11898 CAN-bus using linear bus terminated at each end with 120Ω impedances (e.g. resistors). The speed of the data transmission over the CAN-bus may be of 500 kbps (kilobits per second) or different. The communication protocol between the memory writing device 300 and the ECU 215 over the CAN-bus may be of the type ISO 15765-4, allowing the transmission of data packages of 29 bit. In other embodiments, the communication protocol and/or the dimension of the data packages may be different. The serial communication may be enabled when the memory writing device 300 is connected to the ECU 215, for example to the communication circuit 235 of the ECU 215, through physical electrical cables and/or electrical connectors (not shown). The electrical connectors may include an OBD (On-Board Diagnostic) or an OBDII connector and the correspondent counterparts. In other embodiments, the connectors may be of different kind. This wired connection ensures that the ECU 215 cannot be accessed (e.g. written or overwritten) unintentionally.

The manufacturer of the ECUs may supply the ECU 215 to the manufacturer of the internal combustion engine 100 in a blank state, wherein only the boost program is memorized in the boot storage area 255 of the memory 245, while the program storage area 260 and the data storage area 265 are empty. In other embodiments, the ECU 215 may be supplied with some provisional programs and/or data already stored in the program storage area 260 and the data storage area 265. This provisional programs and/or data may be devised to allow the ECU 215 to execute some functionalities, typically related to the operation of the ECU 215 itself, but not to effectively operate the internal combustion engine 100. Either way, the memory 245 of the ECU 215 needs to be loaded with the control programs and the calibration data (e.g. data tables) necessary to properly operate and control the internal combustion engine 100. The memory 245 of the ECU 215 may also need to be overwritten one or more times during the lifetime of the internal combustion engine 100, for example in order to install new releases containing program/data upgrades or bug corrections.

In order to overwrite software objects in an area of the memory 245, it may be necessary to erase the software objects already existing in that area. As a consequence, in order to write new software objects in a specific area on the memory 245, these new software objects may be first copied on a RAM of the ECU 215, then the specific area of the memory 245 may be erased, and finally the new software objects copied into the RAM may be written into the erased specific area on the memory 245.

These activities may be performed by connecting the ECU 215 with the memory writing device 300. In order to limit the access to the ECU 215 from tampering and/or other unauthorized activities, the memory writing device 300 may only be authorized to have access to the ECU 215 after an authentication procedure has been successfully completed. When the memory writing device 300 gets access to the ECU 215, the device 300 may be enabled to write or overwrite software objects into the memory 245. These software objects may include engine control programs and/or calibration data, such as for example injector codes, vehicle identification number, engine identification number and vehicle manufacturer information. In addition, the memory writing device 300 may be enabled to perform other functions, including, but not limited to, reading data and/or information stored in the memory 245, for example reading the already-mentioned injector codes, vehicle identification number, engine identification number, vehicle manufacturer information and also total engine hours (i.e. the number of hours the engine has been employed).

Figure 4:
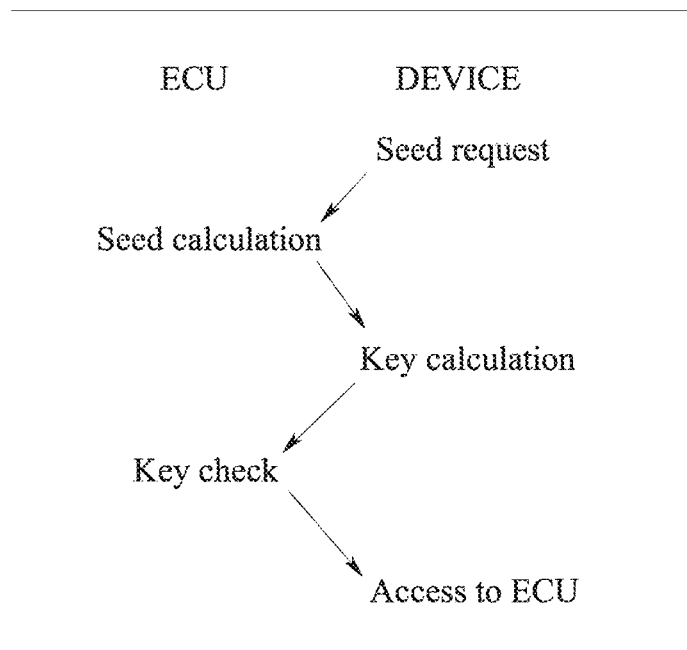
FIG. 4 is a scheme illustrating a seed and key logic.
Figure 5:
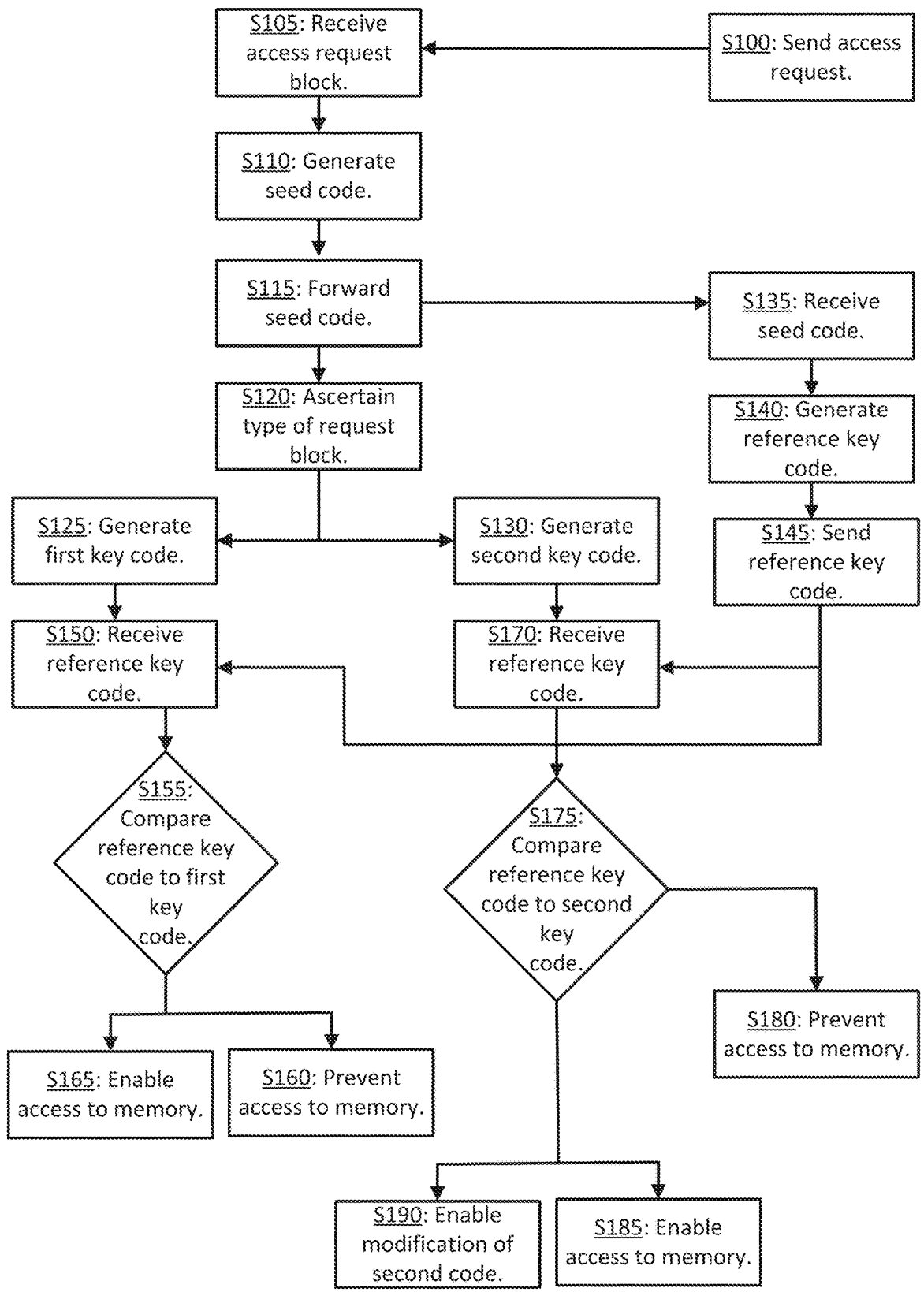
FIG. 5 is a flowchart illustrating a method according to an embodiment of the disclosure.

The authentication procedure that the memory writing device 300 under-goes to have access to the ECU 215 may be based on a seed & key approach. In general, the seed & key approach includes an exchange of information between the ECU 215 and the device 300 which is represented in the scheme of FIG. 4. In practice, the device 300 may send to the ECU 215 a seed request, also referred to as access request. The ECU 215 may reply by generating (e.g. calculating) a seed, also referred to as seed code, and sending this seed to the device 300. The seed may be used by the device to generate (e.g. calculate a key, also referred to as reference key code and sending this key back to the ECU 215. The ECU 215 may then check if the key received from the device is valid. In particular, the ECU 215 may compare the key received from the device 300 with a key that the ECU 215 may generate on the basis of the same seed and using the same calculation logic used by the device 300. If the two keys match (e.g. are equal), the key received from the device 300 is considered valid and the ECU 215 may grant access to the device 300.

On the basis of this scheme, a first embodiment of the authentication procedure is represented in the flowchart of FIG. 4. In practice, once the memory writing device 300 has been connected to the ECU 215, the memory writing device 300 may send to the ECU 215 an access request (block S100). The access request may be an electronic signal having a predetermined codification and/or embodying a predetermined information/instruction. In some cases, the access request may include a request to read or write to the memory or other data associated with the ECU or engine. The access request may be of two alternative types, i.e. a first type access request or a second type access request, wherein the first type access request is different from the second type access request. The access request may be received by the ECU 215 (block S105). In response to the access request, the ECU 215 may be configured to generate a seed code, for example an alphanumeric code (block S110). This seed code may be generated by the CPU 240 using a seed generating algorithm that may be included in the boot program and/or stored in the boot storage area 255 of the memory 245, for example by the supplier of the ECU 215. As an alternative, the seed generating algorithm may be stored in another storage area of the memory 245. After the seed code is generated in block S110, the so-generated seed code may then be forwarded by the ECU 215 to the memory writing device 300 (block S115).

The ECU 215 may additionally or alternatively be configured to ascertain if the access request originally received from the memory writing device is a first type access request or a second type access request (block S120).

If the access request received from the memory writing device 300 is a first type access request, the ECU 215 may be configured to generate a first key code, for example another alphanumeric code (block S125). This first key code may be generated by the CPU240 using a key generating algorithm that may be included in the boot program and/or stored in the boot storage area 255 of the memory 245, for example by the supplier of the ECU 215. As an alternative, the seed generating algorithm may be stored in another storage area of the memory 245. In particular, the first key code may be generated on the basis of the seed code and a first identification code (e.g. a first password). By way of example, the first key code may be generated using a predetermined combinational logic and/or function of the seed code and the first identification code. The first identification code may be another alphanumeric code. The first identification code may be univocally attributed to the manufacturer of the internal combustion engine 100, so that the engine manufacturer may be the only one who knows the first identification code. The first identification code may be stored in the memory 245, for example by the supplier of the ECU 215. In particular, the first identification code may be stored in the boot storage area 255 or in another storage area. According to some embodiments, the first identification code may be stored at a fixed and predetermined memory address of the memory 245. This memory address may be written in the key generating algorithm, so that the CPU 240, while executing the key generating algorithm, can immediately retrieve the first identification code from the prescribed memory address.

If conversely, the access request received from the memory writing device 300 is a second type access request, the ECU 215 may be configured to generate a second key code, for example another alphanumeric code (block S130). In particular, the second key code may be generated on the basis of the seed code and a second identification code (e.g. a second password). The second key code may be generated by the CPU 240 using a predetermined combinational logic and/or function of the seed code and the second identification code. By way of example, second key code may be generated using the same key generating algorithm used for the first key code. The second identification code may be another alphanumeric code. The second identification code may be generally attributed to the purchasers of the internal combustion engine 100, for example to the manufacturers of the vehicles which is equipped with the internal combustion engine 100. In other words, this second identification code, which may be chosen by the engine manufacturer, may be communicated to all the vehicle manufacturers and/or other clients, so that each one of them knows the second identification code. The second identification code may be stored in the memory 245, for example by the supplier of the ECU 215 or by the engine manufacturer. In particular, the second identification code may be stored in the program storage area 260 or in the data storage area 265 or in another storage area.

According to some embodiments, the second identification code may be stored at a fixed and predetermined memory address of the memory 245. However, the space available in the memory 245, particularly in the program storage area 260 or in the data storage area 265, usually depends on the dimension and/or position of the engine control programs and/or calibration data that are stored therein and may vary depending on the releases. In addition, the second identification code may have different dimensions (e.g. different number of bits) case by case. For these and other reasons, it could be difficult to locate the second identification code at a fixed memory address. To solve this issue, some embodiments may allow for the second identification code to be stored at different memory addresses of the memory 245 and to be retrieved by the ECU 215 using a pointer to said memory address. The pointer may be a software object, for example a code, which simply encrypts the memory address of the second identification code. The pointer code may have a fixed dimension and may be stored into the memory 245 at a predetermined and fixed memory address, for example at the last memory address that is available in the memory 245. The memory address of the pointer code may be written in the key generating algorithm, so that the ECU 215, while executing the key generating algorithm, may retrieve the pointer code from its memory address, decrypt the pointer code to get the memory address of the second identification code and then retrieve the second identification code.

The seed code is also received by the memory writing device 300 (block S135) which may be configured to use it for generating a reference key code, for example another alphanumeric code (block S140). In particular, the reference key code may be generated on the basis of the seed code received from the ECU 215 and a third identification code (e.g. a third password). This third identification code may be provided to the memory writing device 300 by a user thereof, for example through a user interface such as a keyboard, a card reader or other. As an alternative, the third identification code may be stored in the memory 310. Either way, the reference key code may be generated using the same kind of key generating algorithm used by the ECU 215. The key generating algorithm may be stored in the memory 310 of the memory writing device 300. In this way, if the third identification code corresponds (e.g. is equal to) to the first identification code or the second identification code stored in the memory 245 of the ECU 215, the reference key code generated by the memory writing device 300 will correspond (e.g. will be equal) to the first key code or to the second key code generated by the ECU 215. The memory writing device 300 may be configured to send the reference key code back to the ECU 215 (block S145).

In case the access request was a first type access request, the ECU 215 may be configured to receive the reference key code (block S150) and to compare the reference key code received from the memory writing device 300 with the first key code (block S155). The comparison may be performed by the CPU 240 through the execution of a verification algorithm that may be included in the boot program or stored into the boot storage area 255 or into other storage areas of the memory 245. If this comparison yields that the reference key code is different from the first key code, e.g. because the third identification code used by the memory writing device 300 is different from the first identification code into the ECU 215, the ECU 215 may be configured to prevent the memory writing device 300 from having access to the memory 245 (block S160) and, in particular, from writing or overwriting software objects into the memory 245. If conversely the reference key code corresponds to the first key code, the ECU 215 may enable the memory writing device 300 to have access to the memory 245 (block S165) and, in particular, to write or overwrite software objects into the memory 245. These software objects may include at least engine control programs, to be written or overwritten for example into the program storage area 260, and/or calibration data, to be written or overwritten for example into the data storage area 265.

In case the access request was a second type access request, the ECU 215 may be configured to receive the reference key code (block S170) and to compare the reference key code received from the memory writing system 300 with the second key code (block S175). Also this comparison may be performed by the CPU 240 through the execution of a verification algorithm that may be included in the boot program or stored into the boot storage area 255 or into other storage areas of the memory 245. If this comparison yields that the reference key code is different from the second key code, e.g. because the third identification code used by the memory writing device 300 is different from the second identification code into the ECU 215, the ECU 215 may be configured to prevent the memory writing device 300 from having access to the memory 245 (block S180) and, in particular, from writing or overwriting software objects into the memory 245. If conversely the reference key code corresponds to the second key code, the ECU 215 may enable the memory writing device 300 to have access to the memory 245 (block S185) and, particularly, to write or overwrite software objects into the memory 245. Also in this case, these software objects may include at least engine control programs, to be written or overwritten for example into the program storage area 260, and/or calibration data, to be written or overwritten for example into the data storage area 265.

According to an aspect of the disclosure, if the reference key code received from the memory writing device 300 in this case corresponds to the second key code, the ECU 215 may also enable the memory writing device 300 to modify the second identification code (block S190), for example by overwriting the second identification code already existing on the memory 245 with a new and different code (e.g. a different password). In some embodiments, the new second identification code may be allowed to have a different length with respect to the original one. The new second identification code may be included in a package of data provided and authorized by the engine manufacturer and that can be written (flashed) into the memory 245 by the vehicle manufacturer using the memory writing device 300. In this way, once the internal combustion engine 100 has been purchased, each vehicle manufacturer may personalize the second identification code, keeping it secret from all the other vehicle manufacturers that purchase the same internal combustion engine.

Figure 6:
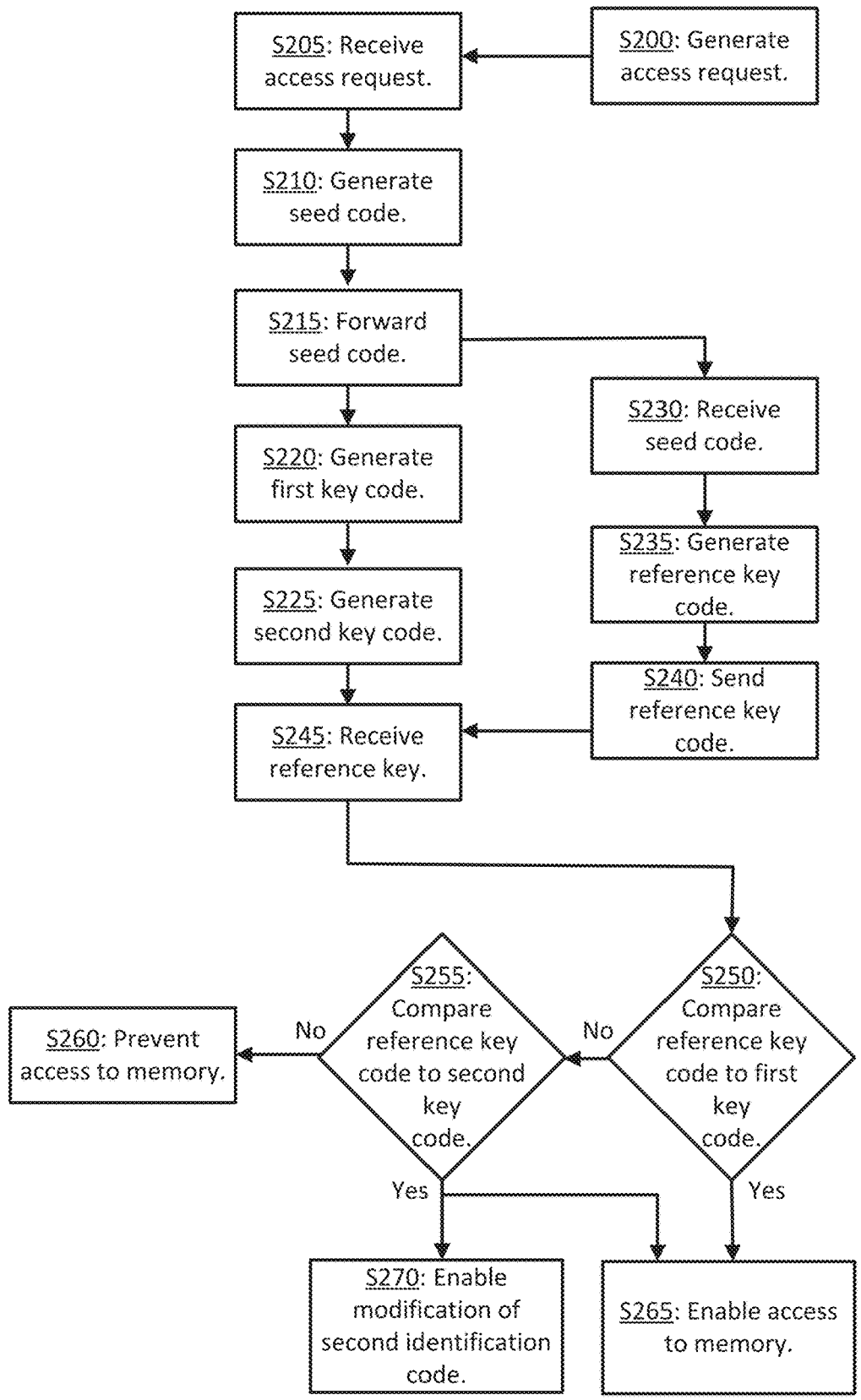
FIG. 6 is a flowchart illustrating a method according to another embodiment of the disclosure.

Another embodiment of the authentication procedure is represented in the flowchart of FIG. 6. According to this embodiment, once the memory writing device 300 has been connected to the ECU 215, the memory writing device 300 may generate an access request (block S200). In this case, the access request may be a single generic access request. The access request may be received by the ECU 215 (block S205). In response to the access request, the ECU 215 may be configured to generate a seed code (block S210). The seed code may have the same properties and may be generated in the same way as already described in connection with the first embodiment above. The so-generated seed code may then be forwarded by the ECU 215 to the memory writing device 300 (block S215).

The seed code may be also used by the ECU 215 to generate both the first key code (block S220) and the second key code (block S225). The first key code and the second key code may have the same properties and may be generated in the same way as already described in connection with the first embodiment above. On the other hand, the seed code may be also received by the memory writing device 300 (block S230), which may be configured to use it for generating the reference key code (block S235). Once generated, the reference key code may be sent back by the memory writing device 300 to the ECU 215 (block S240). The reference key code may have the same properties and may be generated in the same way as already described in connection with the first embodiment above.

At this point, the ECU 215 may be configured to receive the reference key code (block S245) and to compare the reference key code with the first key code (block S250). If this comparison yields that the reference key code is different from the first key code, the ECU 215 may be configured to compare the reference key code with the second key code (block S255). In other embodiments, the ECU 215 may compare the reference key code with the second key code first and then with the first key code. Some other embodiments may prescribe to compare the reference key with the first and with the second key codes at the same time. In any case, these comparisons may be performed by the CPU 240 through the execution of a verification algorithm that may be included in the boot program or stored into the boot storage area 255 or into other storage areas of the memory 245.

If the reference key code is different from both the first key code and the second key code, the ECU 450 may be configured to prevent the memory writing device 300 from getting access to the memory 245 (block S260) and, particularly, from writing or overwriting software objects into the memory 245. If conversely, the reference key code corresponds to the first key code or to the second key code, the ECU 215 may enable the memory writing device 300 to get access to the memory 245 (block S265) and, particularly, to write or overwrite software objects into the memory 245. Also in this case, these software objects may include at least engine control programs, to be written or overwritten for example into the program storage area 260, and/or calibration data, to be written or overwritten for example into the data storage area 265. In particular, if the reference key code corresponds to the second key code, the ECU 215 may be further configured to enable the memory writing device 300 to modify the second identification code (block S270) as already explained in connection with the first embodiment.

In some embodiments, the memory writing device 300 may be allowed to modify the second identification code also if the reference key code corresponds to the first key code, so that also the engine manufacturer can change this code if needed. Other embodiments may prescribe that the memory writing device 300 is never authorized to modify the first identification code and/or to write or overwrite software objects into the boot storage area 255.

The authentication procedures described above guarantee that authorized personnel of both the engine manufacturer and the vehicle manufacturer can write or overwrite software objects into the memory 245 of the ECU 215, particularly into the program storage area 260 and/or in the data storage area 265. However, it is worth highlighting that the software objects allowed to be written or overwritten into the memory 245 may only be software objects (e.g. programs and/or data) that have been released and approved by the engine manufacturer.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. An electronic control unit comprising a processor that accesses a memory, the processor configured to:
   receive an access request from a device;
   access a first identification code from the memory at a first address, the first identification code being associated with an engine manufacturer;
   calculate a seed based on the first identification code and send the seed to the device;
   receive a key generated by the device based on the seed;
   determine if the key is valid;
   grant access to the device when the determination indicates the key is valid;
   after access is granted, receive a second identification code from the engine manufacturer, the second identification code associated with one or more vehicle manufacturers; and
   write the second identification code to the memory at a second address for use by the one or more vehicle manufacturers for future access requests.

2. The electronic control unit according to claim 1, the device is enabled to write, into the memory, at least one engine control program.

3. The electronic control unit according to claim 1, wherein the device is enabled to write, into the memory, at least calibration data.

4. The electronic control unit according to claim 3, wherein the calibration data includes a quantity for a fuel injector.

5. The electronic control unit according to claim 1, the processor configured to:
   receive data for at least one engine operating parameter.

6. The electronic control unit according to claim 5, wherein the at least one engine operating parameter includes an accelerator position or an engine speed.

7. The electronic control unit according to claim 5, wherein the at least one engine operating parameter is collected by an intake manifold pressure and temperature sensor, a combustion pressure sensor, a coolant and oil temperature and level sensors, a fuel rail pressure sensor, a cam position sensor, a crank position sensor, exhaust pressure and temperature sensors, a temperature sensor or an accelerator position sensor.

8. The electronic control unit of claim 1 wherein the processor is further configured to communicate the second identification code to enable the vehicle manufacturer to have access to the second identification code.

9. An electronic control unit comprising a processor that accesses a memory, the processor configured to:
receive a seed request from a memory writing device;
access a first identification code from the memory at a first address, the first identification code being associated with an engine manufacturer;
calculate a code based on the first identification code;
send the code to the device;
receive a first key generated by the device based on the code;
perform a comparison of the key received from the device to a second key generated by the electronic control unit;
grant access to the device in response to the comparison;
after access is granted, receive a second identification code from the engine manufacturer, the second identification code associated with one or more vehicle manufacturers; and
write the second identification code to the memory at a second address for use by the one or more vehicle manufacturers for future access requests.

10. The electronic control unit of claim 9, wherein the code is calculated from a boot program for the electronic control unit.

11. An engine comprising:
an engine block comprising at least one cylinder;
at least one sensor;
at least one engine control device; and
an engine control unit configured to receive data from the at least one sensor and send one or more signals to the at least one engine control device in response to the data, the engine control unit configured to:
receive a seed request from a memory writing device;
access a first identification code from the memory at a first address, the first identification code being associated with an engine manufacturer;
calculate a code based on the first identification code;
send the code to the device;
receive a first key generated by the device based on the code;
perform a comparison of the key received from the device to a second key generated by the engine control unit;
grant access to the device in response to the comparison;
after access is granted, receive a second identification code from the engine manufacturer, the second identification code associated with one or more vehicle manufacturers; and
write the second identification code to the memory at a second address for use by the one or more vehicle manufacturers for future access requests.

12. The engine of claim 11, wherein the at least one sensor includes an intake manifold pressure and temperature sensor, a combustion pressure sensor, a coolant and oil temperature and level sensors, a fuel rail pressure sensor, a cam position sensor, a crank position sensor, exhaust pressure and temperature sensors, a temperature sensor or an accelerator position sensor.

13. The engine of claim 11, wherein the code is calculated from a boot program for the engine control unit.

* * * * *